United States Patent
Collins

(10) Patent No.: US 7,468,723 B1
(45) Date of Patent: Dec. 23, 2008

(54) APPARATUS AND METHOD FOR CREATING LARGE DISPLAY BACK-LIGHTING

(75) Inventor: Michael J. Collins, Longmont, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 565 days.

(21) Appl. No.: 11/073,005

(22) Filed: Mar. 4, 2005

(51) Int. Cl.
*G09G 3/36* (2006.01)
(52) U.S. Cl. .......................... 345/102; 345/82
(58) Field of Classification Search .......... 345/102, 345/76–83
See application file for complete search history.

(56) References Cited

U.S. PATENT DOCUMENTS

| 6,359,392 | B1 | 3/2002 | He |
| 6,556,067 | B2 | 4/2003 | Henry |
| 6,750,842 | B2 | 6/2004 | Yu |
| 7,002,547 | B2 * | 2/2006 | Yamada ...................... 345/102 |
| 7,109,957 | B2 * | 9/2006 | Yang ............................ 345/82 |
| 7,262,752 | B2 * | 8/2007 | Weindorf ..................... 345/82 |

FOREIGN PATENT DOCUMENTS

JP    2002373795 A  * 12/2002

* cited by examiner

*Primary Examiner*—Amr Awad
*Assistant Examiner*—Michael Pervan
(74) *Attorney, Agent, or Firm*—Darby & Darby P.C.; Matthew M. Gaffney

(57) ABSTRACT

A driver for a series-coupled white LED string is provided. The driver includes a boost converter that is arranged to provide an output voltage from a source voltage. Also, the driver includes one switch that is coupled across half of the series-coupled LEDs, and another switch that is coupled across the other half of the series-coupled LEDs. A 50% duty cycle signal is employed to control the switches. While the boost converter is enabled, one of the switches is on and the other is off.

12 Claims, 5 Drawing Sheets

APPARATUS AND METHOD FOR CREATING LARGE DISPLAY BACK-LIGHTING

FIELD OF THE INVENTION

The invention is related to LED drivers, and in particular, to an apparatus and method for using a relatively large LED count while driving all of the LEDs in series.

BACKGROUND OF THE INVENTION

Light-emitting diodes (LEDs) may be used for lighting in portable electronics applications, and the like. For example, white LEDs may be used for back-lighting applications. Typically, several white LEDs are coupled in series. A boost switching regulator may be employed to provide a voltage across the white LEDs.

BRIEF DESCRIPTION OF THE DRAWINGS

Non-limiting and non-exhaustive embodiments of the present invention are described with reference to the following drawings, in which.

DETAILED DESCRIPTION

Figure 1:
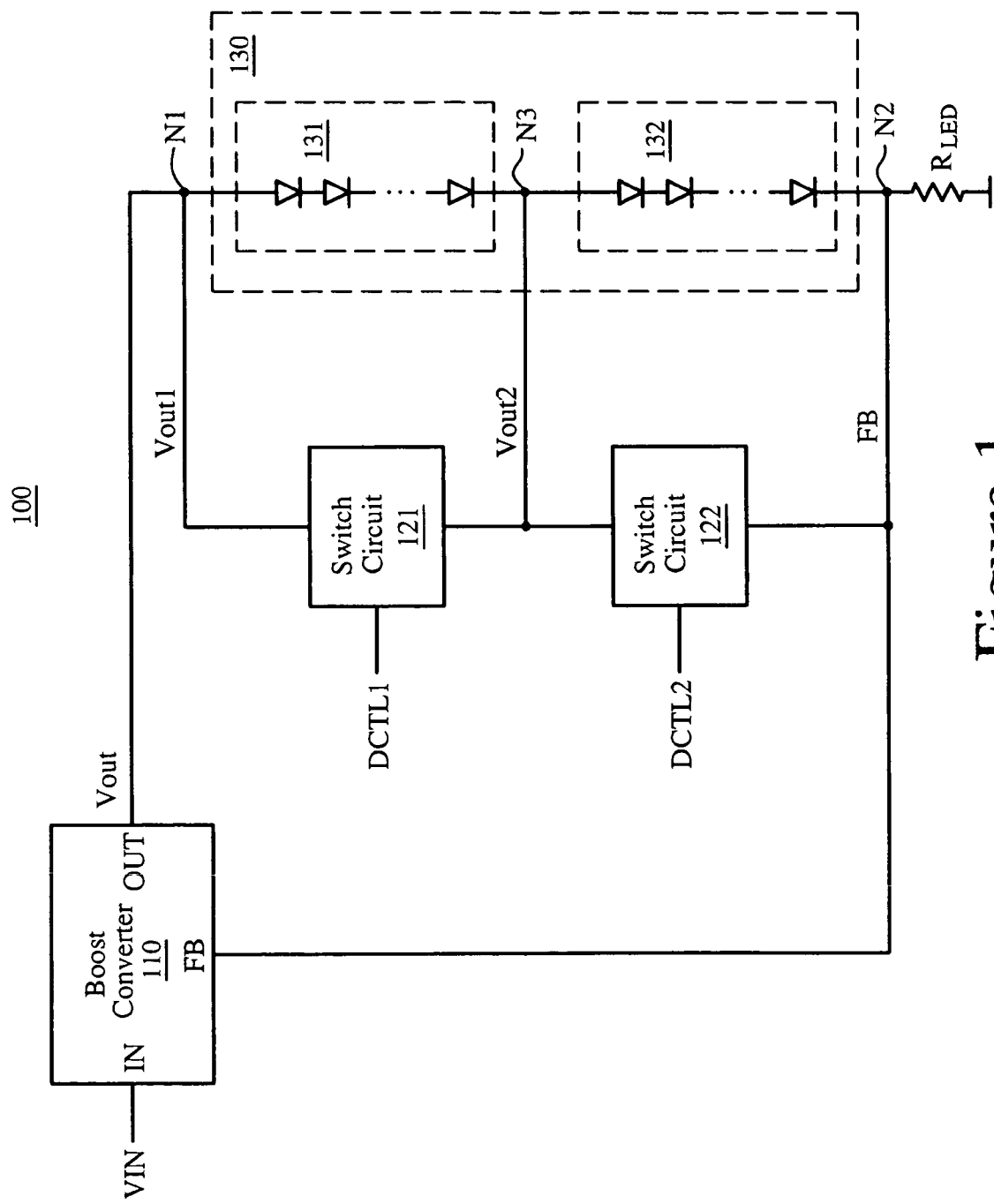
FIG. 1 illustrates a block diagram of an embodiment of a circuit for driving a series LED string.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a singe component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a driver for a series-coupled white LED string. The driver operates as follows in one embodiments. The driver includes a boost converter that is arranged to provide an output voltage from a battery voltage. Also, the driver includes one switch that is coupled across half of the series-coupled LEDs, and another switch that is coupled across the other half of the series-coupled LEDs. A 50% duty cycle signal is employed to control the switches. While the boost converter is enabled, one of the switches is on and the other is off.

FIG. 1 illustrates a block diagram of an embodiment of a circuit 100. In one embodiment, circuit 100 includes boost converter 110, sense resistor RLED, switch circuits 121 and 122, and series-coupled LED string 130. Series-coupled LED string 130 includes white LED block 131 and white LED block 132. Each of the white LED blocks includes a plurality of series-coupled white LEDs. White LED block 131 is series-coupled to white LED block 132. White LED block 131 is coupled between first output node N1 and second output node N3. White LED block 132 is coupled between second output node N3 and feedback node N2.

In operation, boost converter 110 provides output voltage Vout from input voltage VIN. Also, boost converter 110 is arranged to regulate output voltage Vout based on feedback signal FB. In one embodiment, feedback signal FB is provided by sense resistor RLED based on the current through sense resistor RLED.

Further, circuit 100 includes a plurality of switch circuits that are arranged to selectively short separate portions of a plurality of portions of the string of series-coupled light-emitting diodes over time such that a cardinality of the light-emitting diodes in the sting of series-coupled light-emitting diodes that are on is fixed while the circuit for driving is enabled. In one embodiment, as illustrated in FIG. 1, the plurality of switch circuits includes switch circuit 121 and 122, and the plurality of portions includes white LED block 131 and white LED block 132.

In one embodiment, circuit 100 operates as follows. Switch circuit 121 is coupled between nodes N1 and N3 to short white LED block 131 if signal DCTL1 is asserted. Also, switch circuit 122 is coupled between nodes N3 and N2 to short white LED block 132 if signal DCTL2 is asserted. Signal DCTL1 and DCTL2 are provided so that, while boost converter 110 is operating, one of the white LED blocks is on, and the other is off. Output voltage Vout is regulated to a first output voltage level Vout1 when signal DCTL2 is asserted, and is regulated to a second output voltage level Vout2 when signal DCTL1 is asserted, where voltage Vout1 and Vout2 are approximately the same.

In one embodiment, signal DFCTL1 is a 50% duty cycle clock signal, and signal DCTL2 is another 50% duty cycle clock signal that is approximately an inverse of signal DCTL1. Switch circuit 121 is configured to close when signal DCTL1 is asserted, and to open when signal DCTL1 is unasserted. Switch circuit 122 is configured to close when signal DCTL2 is asserted, and to open when signal DCTL2 is unasserted. Signals DCTL1 and DCTL2 are preferably at least 60 Hz so that the switching is not visible.

Also, in this embodiment, string 130 includes 2*N diodes, and branch 131 and 132 each contain N diodes. Circuit 100 is arranged to drive sting 130 so that N of the 2*N LEDs are driven at a time. In one embodiment, N can be ten. In another embodiment, N can be eight. For a PWM boost converter operating in continuous mode, the maximum number of LEDs in each block, Nmax, is based on the following two equations:

Nmax=[(VIN/(1−Dmax))−VFB]/VLED, and $V_{Cout(max)}$=Nmax*VLED+VFB, where Dmax is the maximum duty cycle of boost converter 110, VFB is the voltage associated with feedback signal FB, $V_{Cout(max)}$ is the maximum voltage for capacitor Cout, and where VLED is the voltage associated with each LED in LED string 130. A typical VLED voltage is about 3.6-4.0 V at 20 mA. Nmax is the maximum number of LEDs in one of the LED blocks, so that the total maximum number of LEDs is string 130, which contains both branches, is 2*Nmax.

In one embodiment, boost converter 110 is a separate circuit from switch circuits 121 and 122. In another embodiment, switch circuit 121 and 122 are included as a part of boost converter 110, and may be included in the same integrated circuit as boost converter 110.

In embodiment, as previously discussed, string 130 is divided into two branches (e.g. 131 and 132), and circuit 100 includes two switches (e.g. 121 and 122) that are arranged to selectively short the two branches (e.g. 131 and 132) over time so that one of the branches is driven at a time. In another embodiment, string 130 is divided into more than two branches, and circuit 100 includes three or more switches that are arranged to selectively short the branches over time so that one of the branches is driven at a time.

Figure 2:
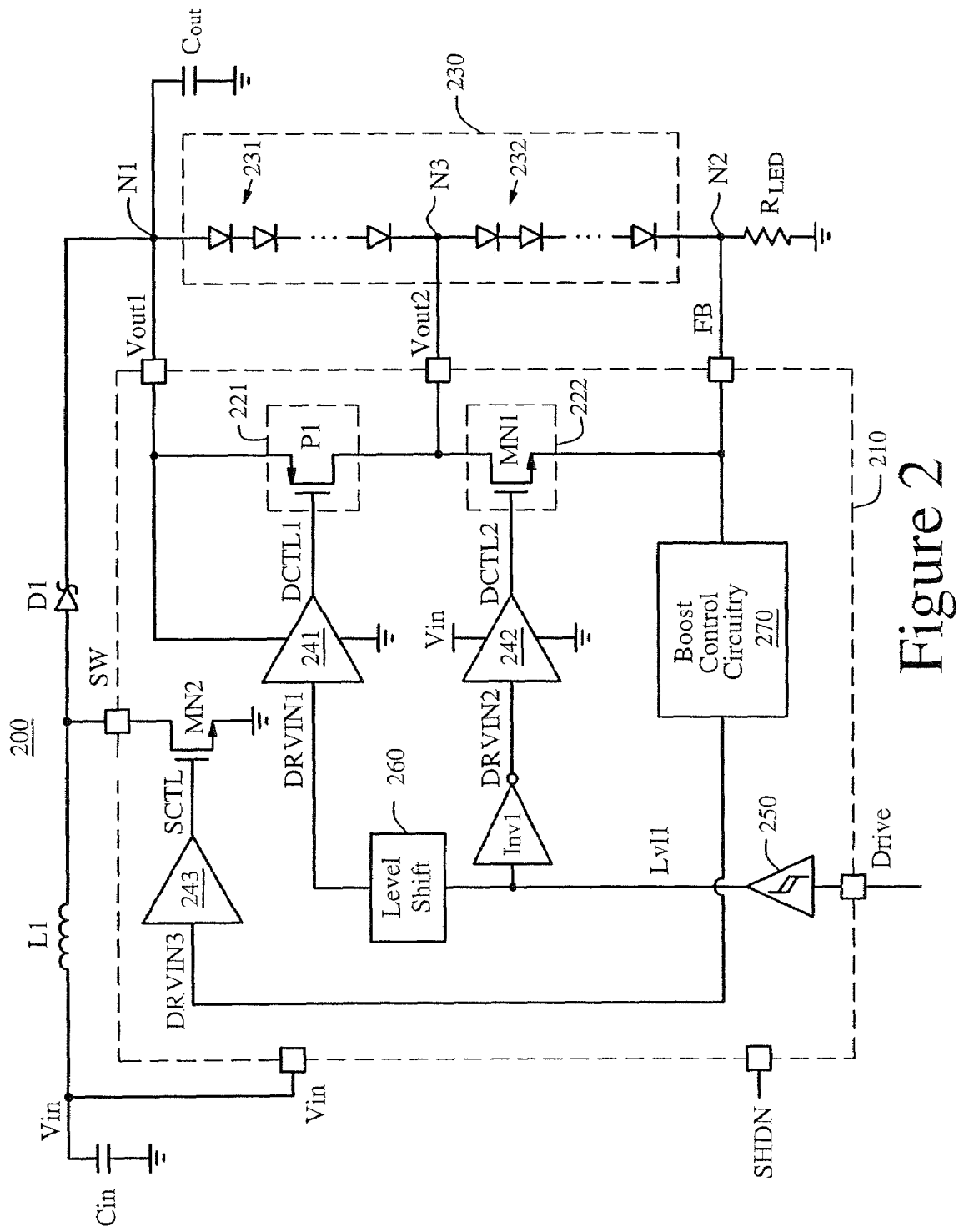
FIG. 2 shows a block diagram of an embodiment of the circuit of FIG. 1 in which an external drive signal is employed for controlling the switch circuits of FIG. 1.

FIG. 2 shows a block diagram of an embodiment of circuit 200. Circuit 200 is an embodiment of circuit 100 of FIG. 1. In one embodiment, as illustrated in FIG. 2, switch circuits 221 and 222 are included in boost converter 210.

In operation, level detector circuit 250 provides level detect output signal Lv1 from drive signal Drive so that signal Lv1 swings from approximately ground to VIN. In one embodiments, signal Drive is a 50% duty cycle clock signal.

Additionally, level shift circuit 260 may be arranged to provide drive input signal DRVIN1 from signal Lv1 such that signal DRVIN1 swings from approximately ground to Vout. Inverter Inv1 may be arranged to provide drive input signal DRVIN2 by inverting signal Lv1. Driver circuit 241 is arranged to provide signal DCTL1 from signal DRVIN1. Similarly, driver circuit 242 is arranged to provide signal DCTL2 from signal DRVIN2. Boost control circuitry 270 is arranged to provide drive input signal DRVIN3 from signal FB. Also, driver circuit 243 is arranged to provide signal SCTL from signal DRVIN3. Signal SHDN may be employed to disable circuit 200.

In one embodiment, the functionality of signals Drive and SHDN may be accomplished with one signal. For example, in one embodiment, if signal Drive is deasserted for a predetermined period of time, circuit 200 is disabled. Further, a timer (not shown) may be used to determine when the predetermined period of time has elapsed.

Level shift circuit 260 is an optional circuit element in circuit 200. For example, in one embodiment, driver circuits 241 and 242 may both use voltage Vout as an upper rail, and voltage detect circuit may provide signal Drive so that signal Lv1 swings from approximately ground to Vout. In this embodiment, level shift circuit 260 is not needed.

Figure 3:
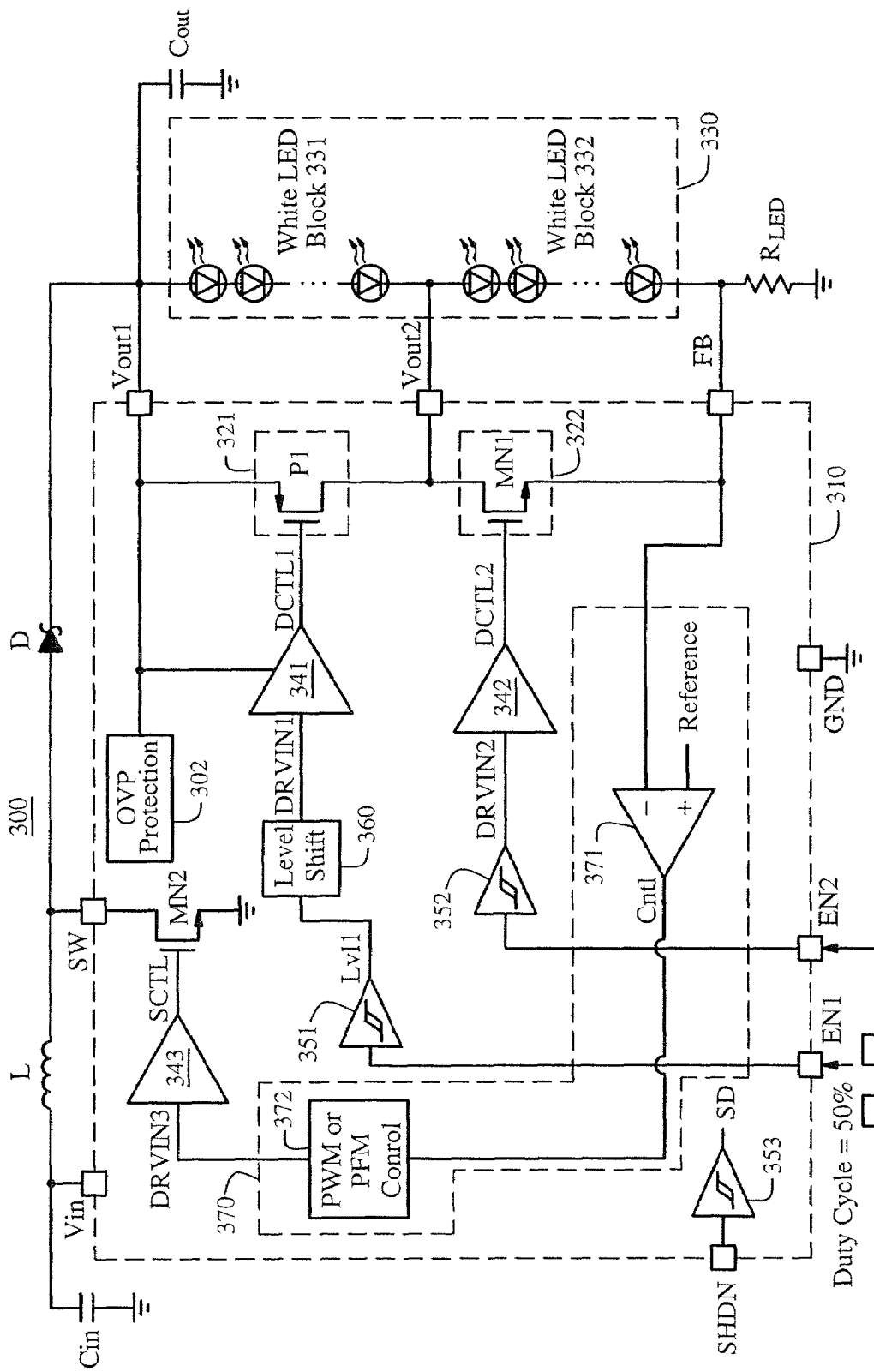
FIG. 3 illustrates a block diagram of an embodiment of the circuit of FIG. 1 in which two external drive signals are employed for controlling the switch circuits of FIG. 1.

FIG. 3 illustrates a block diagram of an embodiment of circuit 300. Circuit 300 is an embodiment of switch circuit 100 of FIG. 1. Circuit 300 is similar to circuit 100, except that two external signals, EN1 and EN2, are employed instead of one. Boost control circuitry 370 includes feedback circuit 371 and pulse control circuit 372.

In operation, feedback circuit 371 provides control signal Cntl from signal FB and reference signal Reference. Also, pulse modulation control circuit 372 is arranged to provide signal DRVIN3 such that a parameter of signal DRVIN3 is modulated based on signal Cntl. In one embodiment, pulse modulation circuit 372 is a pulse width modulation control circuit, and feedback circuit 371 is an error amplifier. In another embodiment, pulse modulation circuit 372 is a pulse frequency modulation circuit, and feedback circuit 371 is a comparator.

In one embodiment, the brightness provided by string 330 is adjustable by adjusting reference signal Reference.

Figure 4:
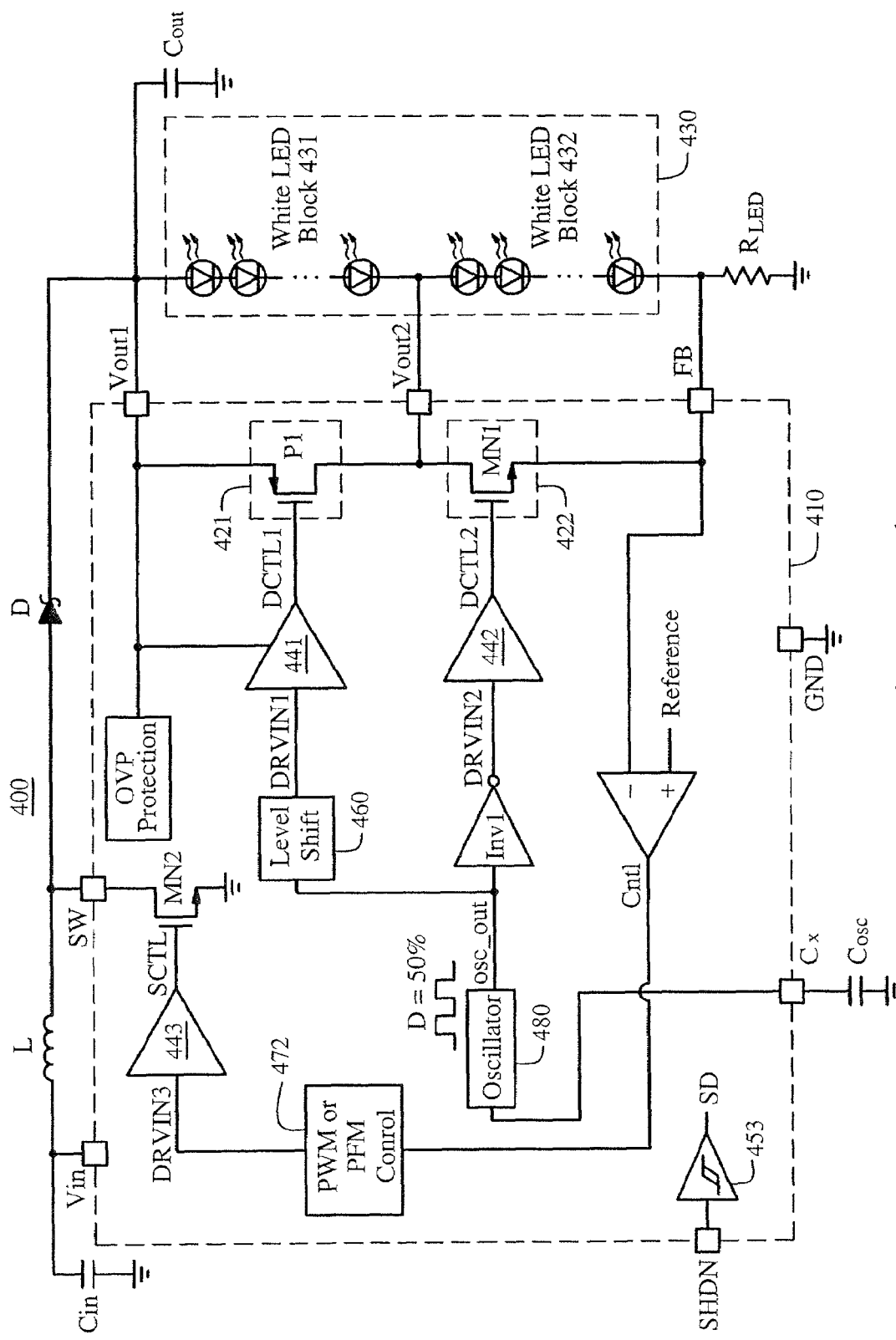
FIG. 4 shows a block diagram of an embodiment of the circuit of FIG. 1 in which an external capacitor is employed for controlling the switch circuits of FIG. 1.

FIG. 4 shows a block diagram of an embodiment of circuit 400, which may be employed as an embodiment of circuit 100 of FIG. 1. In circuit 400, signals DCTL1 and DCTL2 are based on an oscillator output signal that is based on an external capacitance, rather than receiving an external drive signal. Circuit 400 further includes oscillator circuit 480.

In operation, oscillator circuit 480 generates oscillator output signal Osc_out based on the capacitance of external capacitor Cosc. In one embodiment, capacitor Cosc is has an adjustable capacitance for adjusting the frequency of signals DCTL1 and DCTL2.

Additionally, level shift circuit 460 is arranged to provide driver input signal DRVIN1 from signal Osc_out. Inverter Inv1 is arranged to provide signal DRVIN2 from signal Osc_out.

Figure 5:
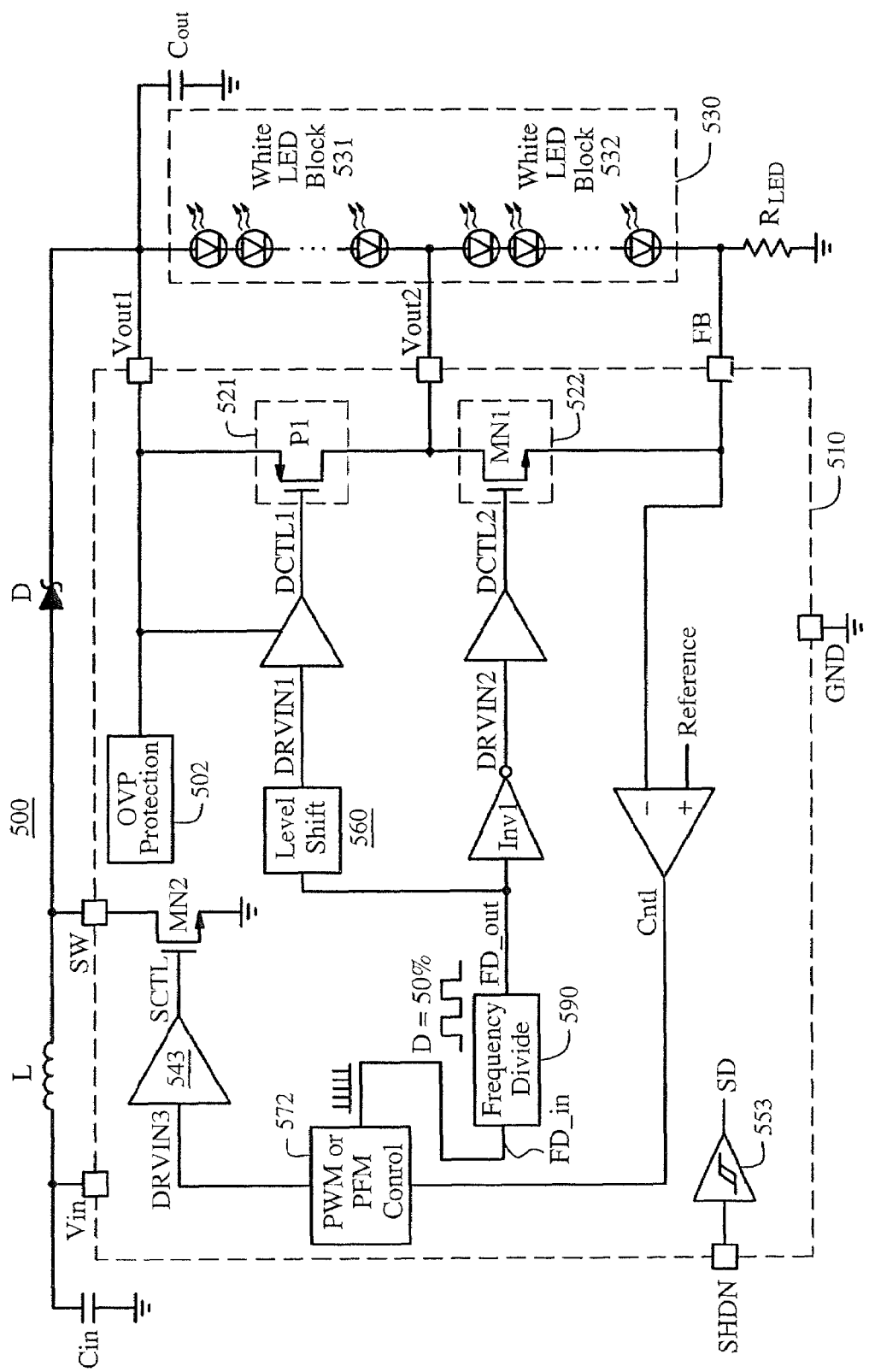
FIG. 5 illustrates a block diagram of an embodiment of the circuit of FIG. 1 in which an internally generated signal is employed for controlling the switch circuits of FIG. 1, arranged in accordance with aspects of the present invention.

FIG. 5 illustrates a block diagram of an embodiment of the circuit 500. Circuit 500 is an embodiment of circuit 100 of FIG. 1. Circuit 500 further includes frequency divider circuit 590. In circuit 500, an internally generated signal is employed for controlling switch circuits 521 and 522.

In one embodiment, pulse modulation control circuit 572 includes an oscillator that produces an oscillator voltage, which may be employed as frequency divider input signal FD_IN. Frequency divider circuit 590 is arranged to provide signal FD_OUT from signal FD_IN. Also, level shift circuit 560 is arrange to provided driver input signal DRVIN1 from signal FD_OUT. Inverter Inv1 is arranged to provide signal DRVIN2 from signal FD_OUT.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for driving a string of series-coupled light-emitting diodes, comprising:
   a plurality of switch circuits that are arranged to selectively short separate portions of a plurality of portions of the string of series-coupled light-emitting diodes over time such that a cardinality of the light-emitting diodes in the string of series-coupled light-emitting didoes that are on is fixed while the circuit for driving is enabled, wherein the plurality of portions includes a portion and another portion;
   the portion includes a half of the series-coupled light-emitting diodes,
   the other portion includes the other half of the series-coupled light-emitting didoes, and
   wherein the plurality of switch circuits includes:
   a first switch circuit that is arranged to short the portion of light-emitting diodes if a first control signal is asserted, wherein the first control signal has a duty cycle of approximately fifty percent; and a second switch circuit that is arranged to short the other portion of light-emitting diodes if a second control signal is asserted, wherein the second control signal is approximately an inverse of the first control signal; and a boost converter that is arranged to regulate an output voltage at a first output node based, in part, on negative feedback based on a feedback voltage at a feedback node, wherein the first switch circuit is coupled between the first output node and a second output node, the second switch circuit is coupled between the second output node and the feedback node, the boost converter is arranged to convert an input voltage into the output voltage, the boost converter is a pulse-width modulation based regulator having a maximum duty cycle, the string includes 2*N light emitting diodes, first portion include N light-emitting diodes, the second portion includes N light-emitting diodes, the circuit for driving drives N of the 2*N light-emitting diodes at a time, and wherein N is pre-determined in accordance with the equation: N=Floor ([(VIN/(1−Dmax))−VFB]/VLED), where Floor( ) represents truncation such that N is an integer, VIN represents the input voltage, Dmax represents the maximum duty cycle, VFB represents the feedback voltage when the output voltage is at the value to which it is being regulated, and where VLED represents the forward voltage of the light-emitting diodes in the string having the highest voltage of the light-emitting diodes in the string.

2. The circuit of claim 1, wherein
the first switch circuit is arranged to close if the first switch control signal is asserted, and to open if the first switch control signal is unasserted; and
wherein the second switch circuit is arranged to close if the second switch control signal is asserted, and to open if the second switch control signal is unasserted.

3. The circuit of claim 1, further comprising a senses resistor that is coupled between the feedback node and ground.

4. The circuit of claim 1, wherein the first switch circuit is a p-type transistor, and wherein the second switch circuit is an n-type transistor.

5. A circuit for back-lighting a display, comprising:
a first switch circuit that is coupled between a first output node and a second output node;
a second switch circuit that is coupled between the second output node and a feedback node;
a feedback circuit that is arranged to provide a control signal that is based, in part, on a reference signal and a feedback signal at the feedback node, wherein the feedback circuit includes at least one of an error amplifier and a comparator; and
a driver circuit is arranged to drive a power switch based, in part, on the control signal such that an output voltage at the first output node is regulated, wherein the first switch circuit is configured to open and close responsive to a first switch control signal, and wherein the second switch circuit is configured to open and close responsive to a second switch control signal;
a pulse modulation control circuit that is arranged to provide a driver input signal such that a parameter of the driver input signal is modulated based on the control signal, wherein the driver circuit is arranged to drive the power switch based on the driver input signal; and
a frequency divider circuit that is coupled to the pulse modulation circuit, wherein the frequency divider circuit is arranged to provide a frequency divider output signal based on at least one periodic signal generated by the pulse modulation control circuit, such that the frequency divider output signal has approximately a fifty percent duty cycle, wherein the first and second controls signals are based, in part, on the frequency divider output signal; the first switch control signal is based, in part, on the frequency divider output signal such that the first switch control signal has a duty cycle of approximately fifty percent; and wherein the second switch control signal is based, in part, on the frequency divider output signal such that the second switch control signal is approximately an inverse of the first switch control signal.

6. The circuit of claim 5, further comprising:
a first LED branch including a plurality of white light-emitting diodes that are series-coupled between the first output node and the second output node; and
a second LED branch including another plurality of white light-emitting diodes that are series-coupled between the second output node and the feedback node, wherein the first LED branch is coupled in series with the second LED branch, and wherein a cardinality of the white light-emitting diodes in the first LED branch is equal to a cardinality of the white light-emitting diodes in the second LED branch.

7. The circuit of claim 5, further comprising:
an oscillator circuit that is arranged to provide an oscillator output signal such that the oscillator output signal has a duty cycle of approximately fifty percent, and such that the oscillator output signal has a frequency that is based, in part, on a capacitance of an oscillation capacitor, wherein the first switch control signal is based, in part, on the oscillator output signal such that the first switch control signal has a duty cycle of approximately fifty percent and wherein the second switch control signal is based, in part, on the oscillator output signal such that the second switch control signal is approximately an inverse of the first switch control signal.

8. A circuit for back-lighting a display, comprising:
a first switch circuit that is coupled between a first output node and a second output node;
a second switch circuit that is coupled between the second output node and a feedback node;
a feedback circuit that is arranged to provide a control signal that is based, in part, on a reference signal and a feedback signal at the feedback node, wherein the feedback circuit includes at least one of an error amplifier and a comparator;
a driver circuit is arranged to drive a power switch based, in part, on the control signal such that an output voltage at the first output node is regulated, wherein the first switch circuit is configured to open and close responsive to a first switch control signal, and wherein the second switch circuit is configured to open and close responsive to a second switch control signal;
a level-detect circuit that is arranged to provide a level-detect output signal from a drive signal, wherein the first and second switch control signals are based, in part, on the level detect output signal; and
a timer that is arranged to determine if the drive signal is unasserted for a pre-determined period of time, wherein the circuit is arranged to shut down if the timer expires.

9. The circuit of claim 8, further comprising:
a second driver circuit that is arranged to provide the first switch control signal from a second-driver input signal;

a level-shift circuit that is arranged to provide the second-driver input signal from the level-detector output signal;
a third driver circuit that is arranged to provide the second switch control signal from a third-driver input signal;
an inverter that is arranged to provide the third-driver input signal from the level detect output signal; and
a pulse modulation control circuit that is arranged to provide a driver input signal such that a parameter of the driver input signal is modulated based on the control signal, wherein the driver circuit is arranged to drive the power switch based on the driver input signal.

10. A method for back-lighting a display, comprising:
driving a string of series-coupled light-emitting diodes that are coupled between a first output node and a feedback node, wherein driving the string includes:
performing boost regulation to provide an output signal at the first output node from an input signal by converting an input voltage into an output voltage such that the output signal is regulated based, in part, on a feedback voltage at the feedback node, wherein the boost regulation is pulse-width modulation based regulation having a maximum duty cycle; and
selectively shoring separate portions of a plurality of portions of the string of series-coupled light-emitting didoes over time such that a cardinality of the light-emitting diodes in the string of series-coupled light-emitting diodes that are on is fixed while the boost regulation is enabled, wherein selectively shoring the separate portion is accomplished such that the plurality of portions includes a portion including a half of the series-coupled light-emitting didoes, and further includes another portion including the other half of the series-coupled light-emitting diodes, wherein the string includes 2*N diodes, and wherein N is predetermined in accordance with the equation: N=Floor ([(VIN/(1−Dmax))−VFB]/VLED), where Floor( ) represents truncation such that N is an integer, VIN represents the input voltage, Dmax represents the maximum duty cycle, VFB represents the feedback voltage when the output voltage is at the value to which it is being regulated, and where VLED represents the forward voltage of the light-emitting didoes in the string having the highest voltage of the light-emitting diodes in the string.

11. The method of claim 10, wherein selectively shorting the separate portions includes:
providing a first control signal such that first control signal has a duty cycle of approximately fifty percent;
providing a second control signal such that the second control signal is approximately an inverse of the first control signal;
shorting the portion of the series-coupled light-emitting diodes if the first control signal is asserted; and
shorting the other portion of the series-coupled light-emitting diodes if the second control signal is asserted.

12. The method of claim 11, wherein:
shorting the portion of the series-coupled light-emitting diodes includes closing a switch circuit that is coupled between the first output node and a second output node if the first control signal is asserted;
shorting the other portion of the series-coupled light-emitting didoes includes closing another switch circuit that is coupled between the second output node and the feedback node; and
wherein driving the string further includes:
opening the switch circuit if the first control signal is unasserted; and opening the other switch circuit if the second control signal is unasserted.

* * * * *